Patented Oct. 24, 1939

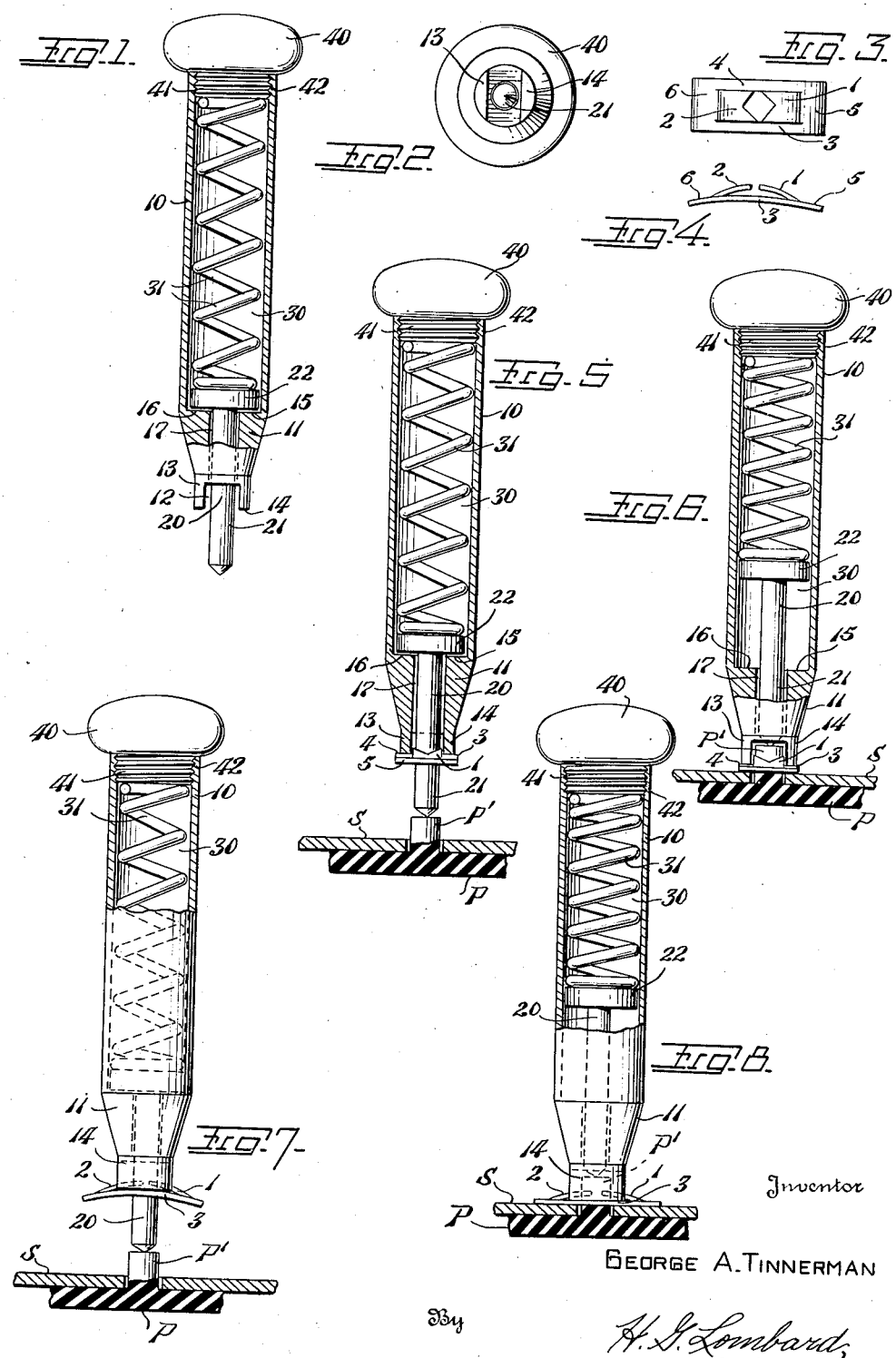

2,177,232

UNITED STATES PATENT OFFICE 2,177,232

TOOL

George A. Tinnerman, Rocky River, Ohio, assignor to Albert H. Tinnerman, Cleveland, Ohio Application August 27, 1937, Serial No. 161,323

2 Claims. (Cl. 81—3)

This invention deals with an improved tool means for use with sheet metal or spring nut devices for applying the same to locked fastening engagement on a threadless shank, stud or conventional threaded bolt simply by direct axial thrust or pressure exerted on the nut itself.

Sheet metal or threadless nut devices with which the tool of the instant invention is employed are constructed of a relatively thin section of sheet metal or heat treated, tempered spring steel from which tongues or similar bolt engaging means are struck and formed to project upwardly out of the plane thereof to engage a bolt or stud under tension. Certain forms of such nut devices comprise end and bridge portions presenting a generally concave base with the tongues projecting upwardly therefrom between the bridge portions. Due to the inherent resiliency of the metal and the manner in which the tongues are provided, such nut devices are capable of quick, easy assembly to fastening engagement onto a bolt or stud by a substantial axial thrust effecting sliding engagement of the said tongues on the stud to applied fastening position against the adjacent work surface or part secured whereupon the nut device becomes tensioned and the tongues thereof embedded in the shank of the bolt or stud under tension in locked engagement therewith thereby resisting loosening and ensuring a tight, rigid installation.

In such applications of sheet metal or spring nut devices to fastening engagement on a bolt or stud, in order to obtain a locking action it is necessary that the nut device be tensioned in applied fastening position. This may be accomplished either by subjecting the generally concave base of the nut device to a substantial flattening operation after attachment to the studs, or by applying pressure to the tongue elements by the use of a tool comprising a pair of arms, or the like, adapted to contact the tongues on either side of the bolt to urge them to tensioned fastening engagement. In any event, both of these procedures require that the nut device be initially attached to the cooperating stud or bolt and then a tool applied thereto for tensioning the same in applied fastening position. In mass production, from the standpoint of speed and efficiency in assembling operations, any such procedure of first applying the nut devices to the studs and then tensioning the same is objectionable in that it is tedious, often unsatisfactory, and necessarily requires an inordinate amount of time of the operator. Also, the step of applying a tool to a nut device after the initial attachment to the stud is not easily accomplished, especially in close quarters, and thus faulty, loose installations too frequently result.

The foregoing objectionable features are eliminated, and speed and economy in assembling operations obtained in the use of the tool in the instant invention which is provided with a guide-pin, or the like, onto which the nut devices are readily positioned preparatory to their application to fastening engagement with a bolt or stud. The guide-pin also serves as a substantial pilot element for quickly and accurately positioning the nut device with respect to the bolt or stud such that when the tool is actuated in a direct axial thrust the nut device is rapidly and easily applied onto the bolt or stud, and, upon further pressure, the generally concave base thereof is flattened against the adjacent surface of the work in tensioned relation thereby disposing the tongues in locked fastening engagement with the bolt or stud.

It is therefore a primary object of this invention to provide a tool for use with sheet metal or spring nut devices, or the like, and comprising a head having elements readily fitting onto the nut devices and adapted for easily and quickly advancing them to most effective locked fastening engagement with a cooperating bolt or stud.

A further object of the invention aims to provide such a tool with head elements for engaging the nut devices at points other than the tongues or similar bolt engaging means thereof, whereby the nut devices may be flattened to tensioned relation on being advanced to fastening position and the tongues disposed in locked engagement with the bolt or stud in such fastening position.

A further object of the invention contemplates the provision of a tool provided with a combined pilot and guide-pin onto which the sheet metal nut devices may be quickly assembled preparatory to the application thereof to locked fastening engagement with a bolt or stud by direct axial pressure exerted on the nut itself.

Another principal purpose is to provide in such a tool, a combined pilot and guide-pin onto which a nut device may be quickly assembled and which also serves to center the nutdevice with respect to the bolt or stud preparatory to the application of the nut device thereto by a direct axial thrust.

Further objects and advantages of the invention will be apparent to those skilled in the art as a description thereof proceeds with reference to the accompanying drawing in which like reference characters designate like parts throughout the same, and in which:

Fig. 1 is a vertical section through the tool body showing the guide-pin and its operating mechanism, the head of the tool being shown in elevation;

Fig. 2 is a bottom plan view of the tool as shown in Fig. 1;

Fig. 3 is a plan view and Fig. 4 is an edge elevation of a form of nut device with which the improved tool may be employed;

Fig. 5 is a vertical section through the head and body of the tool and showing a nut device disposed on the guide-pin preparatory to the application thereof to a threadless stud;

Fig. 6 is a similar view showing the position of the actuating elements of the tool in applying a nut device to fastening position on a threadless stud or bolt;

Fig. 7 is a side view of the tool in the position for applying a nut device as represented in Fig. 5, the tool body being shown partly in section; and, Fig. 8 is a side view of the tool as disposed in the final applied position of a nut device on a threadless stud, a portion of the body of the tool being shown in section.

Referring to the drawing, Figs. 1 and 2 show a preferred embodiment of the invention in the form of a hand tool, comprising a body 10, and a head member 11 at one end. The head member may be provided as an integral part of the tool, as shown, or designed in the form of a separate part having screw threaded engagement with the body member. In either form, the head member is recessed as at 12 to provide head elements 13, 14 of such spacing as to receive between them the tongues or stud engaging elements of a nut device, and also of suitable depth to clear the stud to which the nut device is applied as hereinafter more fully set forth. In the said tool-head 11, a bore 17 is provided for slidingly receiving a guide-pin 20 having an enlarged head 22, which in normal position, rests upon shoulders 15, 16 such that the shank 21, thereof projects a substantial distance beyond the tool-head as shown in Fig. 1. The tool-head 11, including elements 13, 14, preferably is magnetized whereupon a nut device to be applied by the tool may be readily placed on the shank 21 of the guide-pin and held in desired position by the magnetism of the said head elements 13, 14.

The body 10 is provided with a bore 30 adapted for receiving a coil spring 31 which bears against the pin head 22 to maintain the shank 21 in its normal projecting relation with respect to the tool-head 11. The coil spring 31 is held encased in the body 10 by a cap 40 including a plug 41 having screw-threaded engagement with the body as at 42.

Sheet metal or spring nut devices with which the tool of the present invention is employed, are constructed from a relatively thin section of sheet metal, cold rolled metal, spring steel or the like. As shown in Figs. 3 and 4 one form of such nut devices may be obtained from a rectangular section which is deformed to provide end portions 5, 6, and bridge portions 3, 4, between which integral yieldable tongues 1, 2, or similar bolt engaging means extend or project upwardly for engaging a threadless shank, threaded bolt or stud under tension. The said end and bridge portions provide what may be termed, the body of the nut, which body is so formed in the stamping operation as to present a normally untensioned, generally concave base from which the said tongues 1, 2, extend upwardly in substantially ogee formation. When such a nut device is applied to the shank of a threadless stud or bolt, the tongue elements 1, 2, being yieldable, readily slide along the shank to contact the adjacent work surface or part secured; at such point, upon continued pressure, the end portions 5, 6, are moved from their initial, normally untensioned position in the generally concave base outwardly and upwardly in a substantial lifting force which is transmitted to the tongues to urge the extremities thereof inwardly toward each other such that said tongues are caused to dig into and become embedded in the shank and resist any tendency toward reverse movement or loosening. At the same time the bowed bridge portions 3, 4 are elongated such that the generally concave base assumes the position of a substantially flat section, Fig. 8, whereby the nut device is anchored to the threadless stud or bolt with no parts projecting sufficient to be engageable by a conventional tool and accordingly cannot be readily removed except by a special tool by authorized persons.

From the foregoing, it will be understood that the bending moment which serves to lock the nut device onto the stud or bolt is produced by the tensioned bridge and end portions which are flattened against the adjacent surface of the work, and which, in attempting to assume their initial, normally untensioned configuration in the generally concave base, urge the tongue elements inwardly toward each other to locking engagement with the bolt. It has been found that the most effective locking action of the nut devices in a tight, rigid installation is obtained when the generally concave bases thereof are flattened without any substantial pressure being exerted on the tongue elements themselves. Any substantial pressure on the tongues prevents the same from having smooth, sliding engagement with the shank of the bolt or stud on being applied, and also deforms the same with respect to the generally concave base such that the extremities of the tongues are not in most effective contact with the said shank, whereupon the tongues have a tendency to slip in a tight installation thereby resulting in a relatively loose fastening engagement and rendering the nut device useless.

In the use of the tool of the instant invention a tight installation is ensured and any such tendency of the tongues of the nut devices slipping or loosening from applied fastening position is eliminated since the pressure for advancing a sheet metal nut to locked fastening engagement on a threadless stud or bolt is applied more directly to the bridge portions to flatten the generally concave base without deforming the tongues; and thus, when the tool is withdrawn and the attendant pressure removed from the flattened bridge portions, the tension stored therein causes the tongues to become embedded in the shank by line contact substantially as shown in Fig. 8, thereby ensuring a positive locking action at all times. At the same time, an axial force is exerted on the stud by the generally concave base of the nut device in attempting to assume its normal, untensioned configuration, such that the stud not only is locked in applied position, but the member secured thereby is rigidly and tightly maintained in the installation.

The tool of the instant invention, though adapted for use in applying sheet metal nut devices to fastening engagement on a threaded bolt, threadless shank or shouldered stud in any number of installations, is especially suited for applying a nut device to a plastic stud mounting a plastic part to a supporting surface. Thus as shown in Figs. 5-8 inclusive, a plastic part, P, shown in section, is provided in the molding operation with an integral threadless connecting stud P' fitted from one side into an aperture in supporting part S, with the end thereof projecting through onto the opposite side.

In attaching a nut device to the projecting portion of the stud, the plastic part P, is suitably supported against movement relative to the supporting part S, and a nut device easily and quickly applied by the aid of the tool of the instant invention. The procedure comprises first positioning the nut device relative to the stud and then quickly advancing the same to locked fastening position by a simple, direct axial thrust all in one operation. Thus, as shown in Figs. 5 and 7, a sheet metal nut device is placed upon the projecting shank 21 of the guide-pin and seated with the bridge portions 3, 4 in contact with the head elements 13, 14 and the tongues 1, 2 disposed in the space therebetween. Inasmuch as said head elements are magnetized, the nut device is securely held onto the tool-head as positioned on the guide-pin, and accordingly, this permits the tool to be employed in close quarters and other installations in which the connecting stud or bolt is not readily accessible.

With a nut device assembled onto the tool head, the tool is applied to the threadless connecting stud substantially as shown in Figs. 5 and 7 with the pointed extremity of the guide-pin 20 disposed at the approximate center of the stud cross-section thereby centering the nut device relative to the connecting stud. Then, upon pressure in a substantial axial thrust applied to the tool body 10, the coil spring 31 is compressed and the guide-pin caused to slide within the bore 30 such that the tool head elements 13, 14, advance the nut device directly onto the threadless stud P' as shown in Figs. 6 and 8, the tongues 1, 2, or similar bolt engaging means yielding sufficient in an outward direction to permit such movement. Upon continued pressure the head elements 13, 14 in contact with the bridge portions 3, 4, cause the generally concave base of the nut device to become flattened as shown in Fig. 8 and thereby tensioned in desired fastening position. When the tool is withdrawn and the attendant pressure removed from the bridge portions, the nut device naturally tends to assume its initial, normally untensioned generally concave configuration and in so doing urges the tongue elements inwardly toward each other and causes the same to become embedded in locked fastening engagement with the threadless bolt or stud. At the same time, a certain amount of axial pull is exerted by the nut device on the bolt or stud in the assembly thereby drawing the same axially and ensuring a rigid, tight installation at all times.

Naturally when the tool is removed from the assembly, the compressed spring 31 is free to expand outwardly and through contact with the head 22 of the guide-pin urges the same axially relative to the tool body to rest upon shoulders 15, 16 of the tool head in normal position as shown in Fig. 1, whereupon another nut device may be quickly assembled onto the projecting shank 21 of the guide pin and the tool employed for advancing the same to fastening position on a threadless bolt or connecting stud in a repetition of the foregoing procedure.

Though the stud engaging elements of the nut devices are shown and described as comprising cooperating yieldable tongues, other equivalent forms of stud and bolt engaging means in similar nut devices may be effectively applied by the tool of the instant invention to tensioned fastening engagement onto a threadless shank, shouldered stud, or conventional threaded bolt.

And while the tool of this invention has been described in detail with specific examples, such examples are illustrative only since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tool for applying a sheet metal fastening device to fastening engagement with a cooperating stud associated with a part to be secured, the fastening device having a base and projecting stud engaging means, said tool comprising a body having a recessed head providing head elements spaced apart a sufficient distance to straddle said stud engaging means of the fastening device, the recess in the head being of sufficient depth to clear said cooperating stud, a guide pin slidably mounted with respect to said tool head between said spaced head elements, and means for maintaining said guide pin normally in projecting relation to said tool head, said guide pin facilitating application of the tool head to the sheet metal fastening device with said spaced head elements straddling the stud engaging means thereof to thereby engage the base of the fastening device in the application of the same to the cooperating stud by substantially direct axial thrust of said tool body.

2. A tool for applying a sheet metal fastening device to fastening engagement with a cooperating stud associated with a part to be secured, the fastening device having a base and projecting stud engaging means, said tool comprising a hollow body having a recessed head providing head elements spaced apart a sufficient distance to straddle said stud engaging means of the fastening device, the recess in the head being of sufficient depth to clear said cooperating stud, a guide pin slidably mounted with respect to said tool head between said spaced head elements, and a spring member in said hollow body yieldably maintaining said guide pin in normal projecting relation to said tool head, said guide pin facilitating application of the tool head to the sheet metal fastening device with said spaced head elements straddling the stud engaging means thereof and engaging the base of the fastening device, said guide pin serving as a substantial pilot means for centering the fastening device with respect to the cooperating stud in the application thereof to said stud by substantially direct axial thrust of said tool body.

GEORGE A. TINNERMAN.